United States Patent [19]

Kawamura et al.

[11] 3,760,896
[45] Sept. 25, 1973

[54] STEERING DEVICE FOR ENDLESS TRACKED VEHICLES

[75] Inventors: Eiji Kawamura; Hiroyuki Taki, both of Hirakata, Japan

[73] Assignee: Kabushiki Kaisha Komatsu Seisakusho, Tokyo, Japan

[22] Filed: Apr. 19, 1971

[21] Appl. No.: 135,073

[30] Foreign Application Priority Data
Apr. 18, 1970 Japan.............................. 45/32683

[52] U.S. Cl. ............................ 180/6.7, 74/665 T
[51] Int. Cl. ............................................ B62d 11/08
[58] Field of Search.......................... 180/6.7, 6.66; 74/665 T, 730

[56] References Cited
UNITED STATES PATENTS
3,373,636   3/1968   Livezey et al................... 180/6.7 X
3,239,020   3/1919   Morris et al....................... 180/6.7

Primary Examiner—Benjamin Hersh
Assistant Examiner—John A. Pekar
Attorney—James E. Armstrong and Ronald S. Cornell

[57] ABSTRACT

The steering device for endless tracked vehicle provided with dual type power transmission mechanism capable of driving right and left endless track mechanisms separately, which comprises providing right and left clutches for forward and reverse movements between two pivotal turn valves, wherein when a pivotal turn is made, fluid selectively flows into the right and left clutches for forward and reverse movement through the liquid path from the pivotal turn valve as the speed valve for a speed change is in a neutral state.

2 Claims, 2 Drawing Figures

FIG. 2
FIG. 1
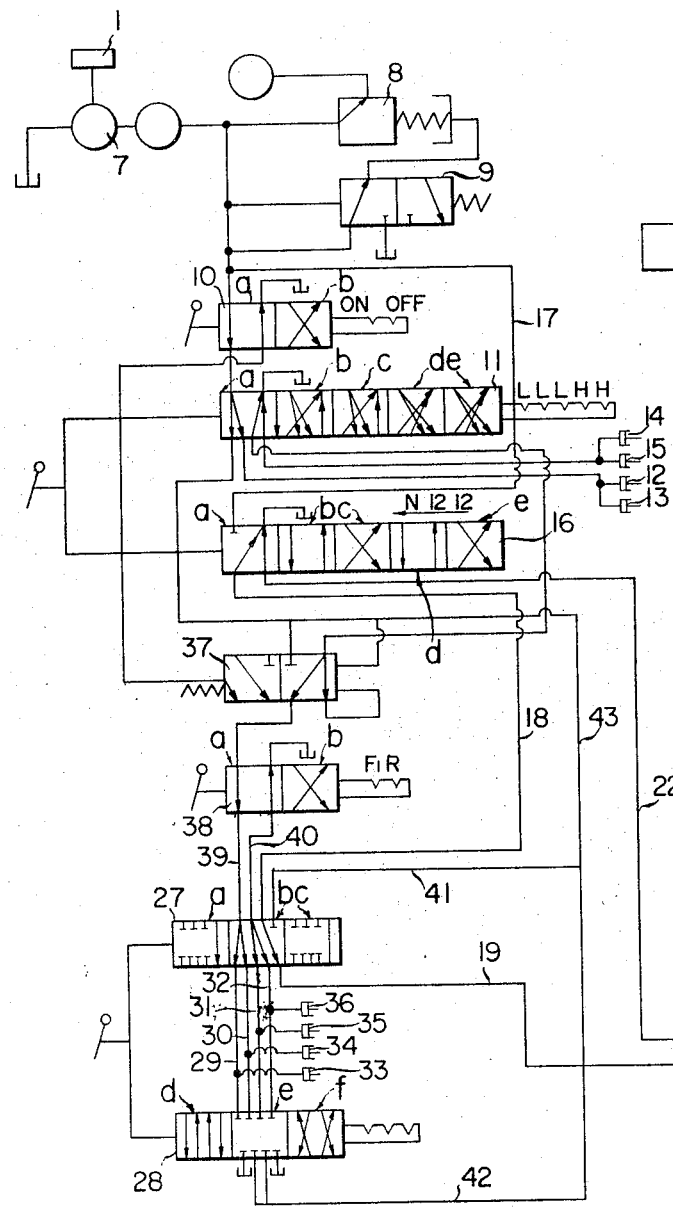
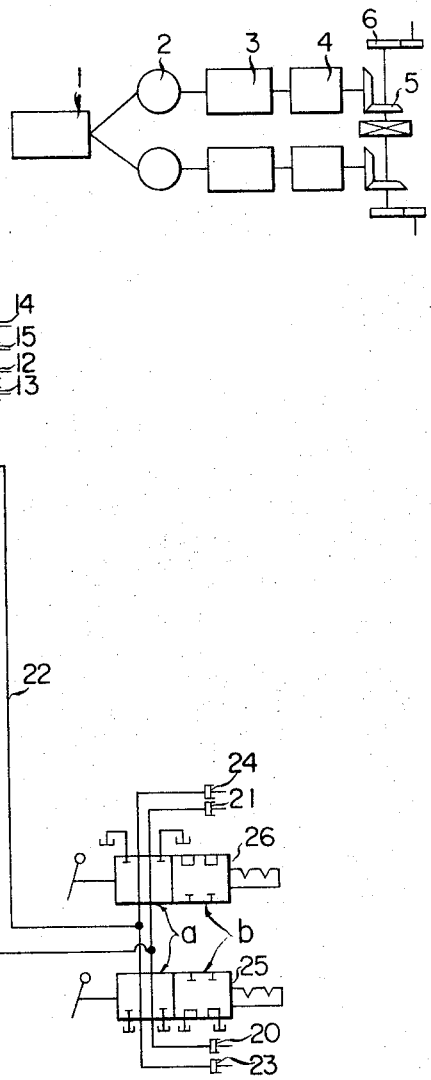
INVENTORS
EIJI KAWAMURA
HIROYUKI TAKI

STEERING DEVICE FOR ENDLESS TRACKED VEHICLES

BRIEF EXPLANATION OF THE INVENTION

The present invention relates to a steering device for endless tracked vehicles having a dual type power transmission mechanism.

There has been a desire to produce endless track vehicles such as bulldozers or like machines, for construction work, and which are capable of making a pivotal turn in such a manner as to improve the operability of the vehicle. However, in the case of large endless tracked vehicles, the inertia or evolution moment is remarkably great, and therefore it is very dangerous for the operator, or it endangers the circumference of the vehicle to abruptly make a pivotal turn while cruising forward or backward or to make a pivotal turn while cruising forward in the second, third, or top gear. In particular, an unexpected hazard is brought about when the operation lever for pivotal turns is pushed in by mistake as the engine is restarted in such a state that the engine stops while cruising in the top gear.

The present invention has been arrived at as a solution to the above described danger, and the object of the present invention is to provide the steering device with improved safety by carrying out the pivotal turn at the speed of the first gear and only when the speed valve is in neutral state.

The steering device of this invention for an endless tracked vehicle having dual type power transmission mechanism capable of driving the right and left endless belts separately, comprises providing right and left clutches for forward and reverse movement between two pivotal turn valves; selectively flowing the fluid passing through the directional valve in an ordinary condition from one of the pivotal turn valves to said right and left clutches for forward and reverse movement; disconnecting said path when a pivotal turn is made, and selectively flowing the fluid into said right and left clutches for forward and reverse movement through the liquid path which is to be opened only when the speed valve for speed change is in neutral state from the other pivotal turn valve.

BRIEF EXPLANATION OF THE ATTACHED DIAGRAMS

The attached diagrams show an embodiment of the present invention;

FIG. 1 is a diagram showing a power line;

FIG. 2 is a diagram showing a transmission valve circuit.

DETAILED EXPLANATION OF THE INVENTION

The structure of the present invention is explained in the following paragraphs in accordance with the attached diagrams.

FIG. 1 is a diagram showing the power line of an endless tracked vehicle having a dual type power transmission mechanism to which the present invention is applied, and in the diagram the power from the engine 1 is equally divided into two parts, and the output from the engine 1 is applied equally and separately to the right and left two rows of driving mechanisms, i.e., torque converters 2, oil pressure transmissions 3, brakes 4, bevel gears 5, and final speed change gears 6.

In the above mentioned dual power transmission mechanism, a forward, reverse four speed transmission is disclosed wherein two transmission valves are combined into one. Thus, the speed change and forward, reverse direction change and steering operation can be carried out with a pump which is a single hydraulic pressure generating source, and this is cited as an embodiment to further illustrate the present invention.

In FIG. 2, 7 is a hydraulic pump driven by the engine 1, and pressurized liquid advanced and pressure forced by said pump 7 has a predetermined pressure adjusted by the pressure modulating valve 8 and quick return valve 9. This liquid goes through the PTO valve 10 having the ports 1, b to the first speed valve 11 for speed change, m and the pressurized liquid then goes into the low speed clutches 12, 13 or high speed clutches 14, 15 for the speed gears of the right and left track devices by appropriately switching the low speed ports a,b,c and high speed ports d, e of the first speed valve for speed change, to activate the respective clutches.

Numeral 16 is the second speed valve to be switched simultaneously along with the first speed valve 11, and has the neutral port a, the first port b,d, and the second port c,e. The fluid path 17, connected to the PTO valve 10, is connected to said valve 16, and the pressurized fluid from said fluid path 17 is sent by the switching operation of said second speed valve 16 through the fluid path 18, the valve 27 for a pivotal turn which is hereinafter described, and through the fluid path 19, to the right and left hand first clutches 20, 21 or is sent through the fluid path 22 to the right and left hand second clutches 23, 24 to selectively activate the respective clutches.

Numerals 25 and 26 are right and left valves for circular turns.

On the other hand, 27 and 28 are the valves for pivotal turns and are to be operated simultaneously along with the operation lever, and have ports a,b,c, and d,e, and f.

Said valves 27 and 28 for pivotal turns are connected by the fluid paths 29, 30, 31 and 32. The fluid path 29 is connected to the left hand forward clutch 33, and the fluid path 30 is connected to the right hand forward clutch 34, and the fluid path 31 is connected to the left hand reverse clutch 35, and the fluid path 32 is connected to the right hand reverse clutch 36.

In regard to the above mentioned clutches 33, 34, 35 and 36, the right hand and left hand forward clutches 33, 34 and the reverse clutches 35 and 36 can be simultaneously turned on by switching the pressurized fluid coming in from the first speed valve 11 through the safety valve 37 during normal operation (when the respective pivotal turn valves 27 and 28 are respectively in the neutral state) by means of directional valve 38.

On the other hand, the fluid path 19 connected to the fluid path 18 is connected to the above mentioned pivotal turn valve 27 in addition to the fluid paths 39 and 40 being connected to the directional valve 38 when the normal cruise is done.

Further, the fluid path 41 to be connected to the above mentioned fluid path 19 when said valve 27 is switched to port a or port c, is connected to the pivotal turn valve 27.

On the other hand, the fluid path 42 is capable of connecting the valve 28 for pivotal turns to the fluid paths 30 and 31 when said valve 28 is switched to the port d. When valve 28 is switched to the port f, the fluid paths 29 and 31, are connected to the valve 28 for pivotal turns, and the fluid path 42 and fluid path 41 are connected to the second speed valve 11 through the fluid path 43.

The structure of the present invention is as described above, and in regard to the circular turn, the same operation is carried out in the first, second, third, and top or high gear.

Therefore, in this specification the operations of circular turn in the forward first gear are explained in the following paragraphs.

In the case of normal forward first gear, the port a of the directional valve 38 is connected to the circuit, and then the first and second speed valves 11 and 16 for speed change are switched by the operation of the operation lever to connect the respective ports b,b, to the circuit.

In this state, the pressurized fluid from the pump 7 is sent to the right and left hand low speed clutches 12 and 13 from the first speed valve 11, and the pressurized fluid is sent to the right and left hand forward clutches 33 and 34 through the pivotal turn valve 27 through the directional valve 38 from the second speed valve 16. Then the fluid is sent to the right and left hand first clutches 20 and 21 through the fluid paths 18 and 19 from the second speed valve 16 to turn on the respective clutches 20 and 21 to obtain the forward first gear speed.

The second, third, and fourth gear speeds can be respectively obtained in the same manner by switching the speed valves 11 and 16.

In order to make the right and left hand circular turn of the vehicle or in order to make the pivotal turn of the vehicle in the above described state, the circular turn valves 25 and 26 are switched, and the pivotal turns can be carried out regardless of said speed valves 11, 16.

When a pivotal turn is carried out, the first and the second speed valves 11 and 16 are put in a neutral state, i.e., after having the respective ports a, a connected to the circuit, the pivotal turn valves 27 and 28 are switched, and the pivotal turns can be made. In order to pivotally turn the vehicle in the right and left directions, the ports a and d of the respective valves 27 and 28 are connected to the circuit.

Thus, when the fluid having been flowed into the right and left hand forward clutches 33 and 34 from the liquid paths 39 and 40 from the directional valve 38, is disconnected, the fluid from the first speed valve 11 is simultaneously flowed into the left hand reverse clutch 35 and right hand forward clutch 34 through the fluid paths 30 and 31 from the pivotal turn valve 28 through the fluid paths 43 and 42 to activate the respective clutches to carry out the left hand pivotal turn.

In this case, fluid is supplied to the fluid path 19 connected to the right and left hand first clutches 20 and 21 from the fluid path 41 connected to the fluid path 43 connected to the first speed valve 11, and the right hand pivotal turn can be carried out in the same manner by switching the right hand pivotal turn valves 27 and 28 to the ports c and f.

When the pivotal turn valves 27, 28 are switched as mentioned above, the right and left hand forward, reverse clutches 33, 34, 35 and 36 can be selectively turned on only when the first and the second speed valves 11 and 16 are in the neutral state, i.e., the respective ports a,a are connected to the circuit, and in this case the right and left hand low speed clutches 12 and 13 are activated, and the above mentioned pivotal turn is done at the first gear speed after all.

As has been described so far in the foregoing paragraphs, the following has been clarified.

The steering device of an endless tracked vehicle having the dual type power driving mechanism capable of driving the right and left track mechanisms separately, can prevent the unexpected difficulties attributable to erroneous or accidental operation, even when the operation lever for pivotal turns is moved by mistake as the engine stops while curising at a high speed, and the engine is restarted in this state.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A steering device for an endless tracked vehicle having a dual type power transmission mechanism for separately driving right and left track means by dividing the engine output into two components to be passed through two parallel rows of sequentially arranged elements including at least two torque converters, hydraulic transmissions, brakes, bevel gears and final speed change gears, said device comprising hydraulic pump means connected to an engine; pressure modulating means connected to said pump means for adjusting the pressure of fluid released therefrom; quick return valve means connected to said modulating means; valve means operatively connected to said pump, said valve means including a first port and second port; a first speed valve for changing speeds coupled to said valve means said first speed valve having a plurality of low speed ports and a plurality of high speed ports; a plurality of low speed clutches and high speed clutches coupled to said first speed valve, for changing the speed gears of said dual type power transmission mechanism; a second speed valve for changing speeds operatively connected to said pump said second speed valve including a neutral port, a plurality of first ports and a plurality of second ports; a plurality of first clutch means for obtaining forward first gear speed and a plurality of second clutch means for obtaining forward second gear speed coupled to said second speed valve; a plurality of pivot valve means for pivotally turning said vehicle said pivot valve means including a plurality of ports; forward clutches and reverse clutches coupled to said pivot valves; and directional valve means coupled to said pivot valve means for controlling the operation of said pivot valve means.

2. A steering device according to claim 1 wherein said first and second clutch means includes first and second turning valves coupled to said second speed valve and clutches coupled to said first and second turning valves.

* * * * *